United States Patent [19]
McNally

[11] 3,770,980

[45] Nov. 6, 1973

[54] PROGRAMMED CYCLE SELECTION CIRCUIT

[75] Inventor: William J. McNally, Newton, Iowa

[73] Assignee: The Maytag Company, Newton, Iowa

[22] Filed: Oct. 6, 1972

[21] Appl. No.: 295,545

[52] U.S. Cl. .................................. 307/141, 307/41
[51] Int. Cl. .......................................... H01h 43/00
[58] Field of Search .................. 307/38, 39, 40, 41, 307/141, 141.4, 141.8, 115, 112; 68/12; 134/57

[56] References Cited

UNITED STATES PATENTS 3,489,913 1/1970 Wildi .................................. 307/41
3,662,186 5/1972 Karklys ............................. 307/141

*Primary Examiner*—Herman J. Hohauser
*Attorney*—William G. Landwier et al.

[57] ABSTRACT

A control system operable for sequencing an apparatus through a selectable cycle of operations includes circuit means for selecting a pair of selectable cycles of operations and for advancing the apparatus through first and second selected cycles in a predetermined order regardless of the order of selection of the two cycles.

15 Claims, 3 Drawing Figures

Fig. 2

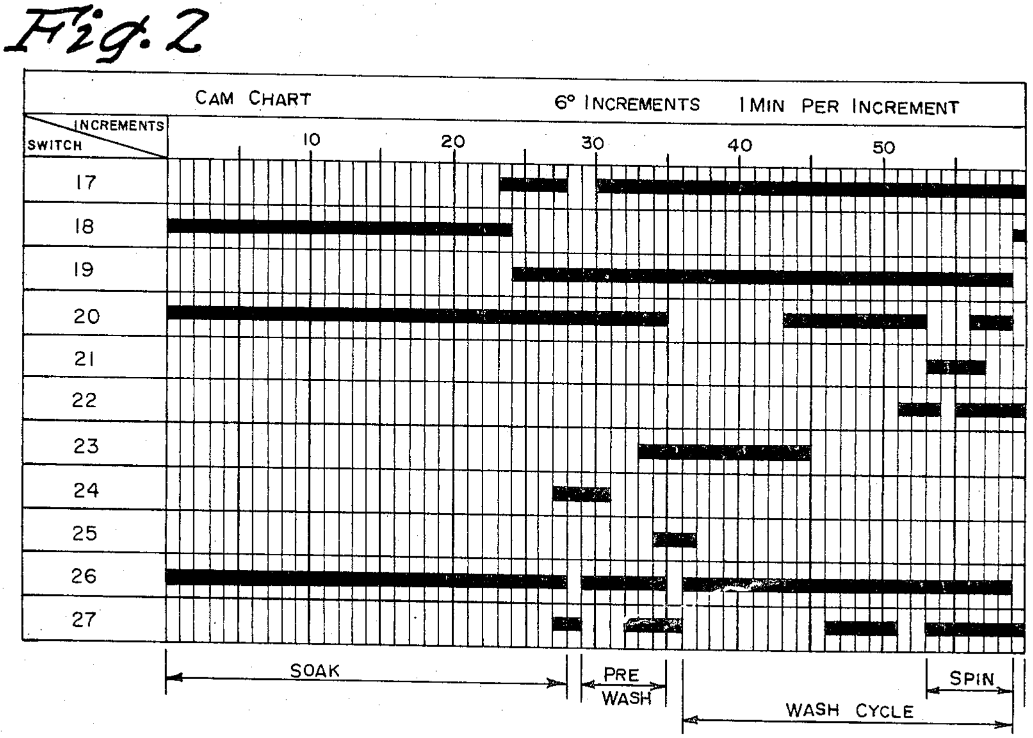

Fig. 3

PRESELECTION SWITCH CHART

| | CYCLES \ SWITCH | 30 | 31 | 32 | 33 | 34 | 35 | 36 | 37 | 38 | 39 |
|---|---|---|---|---|---|---|---|---|---|---|---|
| PRE CYCLE | SOAK | O | ⊠ | X | X | X | O | O | X | O | O |
| PRE CYCLE | PREWASH | ⊠ | O | X | X | X | O | X | O | X | O |
| WASH CYCLE | WHITE | O | ⊠ | X | X | O | O | X | X | X | X |
| WASH CYCLE | COLORED | O | ⊠ | X | X | O | O | X | X | X | X |
| WASH CYCLE | BRIGHT COLORS | O | ⊠ | X | X | O | O | X | X | X | X |
| WASH CYCLE | DELICATE | ⊠ | O | X | X | O | O | X | X | X | X |
| WASH CYCLE | WOOL | ⊠ | O | X | X | O | O | X | X | X | X |
| WASH CYCLE | PERMANENT PRESS | O | ⊠ | X | X | O | O | X | X | X | X |
| AUX CYCLE | SPIN | ⊠ | O | O | X | X | O | X | X | O | O |
| AUX CYCLE | CANCEL | ⊠ | O | X | O | X | O | X | X | O | O |
| | | | | | | | | | | | |
| COMBINED CYCLES | SOAK & WASH | O | ⊠ | X | X | O | X | O | X | X | X |
| COMBINED CYCLES | PREWASH & WASH | ⊠ | O | X | X | O | X | X | O | X | X |
| COMBINED CYCLES | SOAK & PREWASH | O | ⊠ | X | X | X | O | O | X | X | O |
| COMBINED CYCLES | | | | | | | | | | | |

X CLOSED  O OPEN  ⊠ CLOSED - MOMENTARY

PROGRAMMED CYCLE SELECTION CIRCUIT

BACKGROUND OF THE INVENTION

1. Field of the Invention

This invention relates to a control system operable for controlling an apparatus through a plurality of selectable cycles of operations in the proper sequence independently of the order of selection of the selected cycles.

2. Description of the Prior Art

Recent developments in the laundry appliance field have included automatic controls for providing programmed cycles of operations of the appliance. This type of control system includes means for locating the beginning of the desired cycle, sequentially advancing the timer mechanism through the selected cycle, and then stopping or deenergizing the appliance at completion of the selected cycle. Control systems such as disclosed in the assignee's U.S. Pat. No. 3,424,920 have provided for the selection of a plurality of sequentially operable cycles of operation. The circuit of U.S. Pat. No. 3,424,920, however, requires that the desired cycles be selected in the order in which performance is desired.

SUMMARY OF THE INVENTION

It is an object of this invention to provide an improved control system operable for providing control of an apparatus through a pair of individually selectable cycles of operation independent of the order of selection thereof.

It is a further object of this invention to provide an automatic control system by which a pair of cycles of operation of an apparatus may be preselected by the operator for subsequent operation in a predetermined order independent of the order of selection thereof.

It is a further object of the instant invention to provide a control system including a plurality of selectable preliminary cycles and a plurality of selectable secondary cycles of operations wherein the control system is operable for selecting the start point of the preliminary cycle independently of the order of selection of a preliminary cycle and a secondary cycle.

The present invention achieves the above objectives in a control system having sequence control means operable for controlling operation of an apparatus through a plurality of selectable cycles of operation. The sequence of operation through the selected cycles is predetermined and occurs independently of the order of selection of the cycles and without additional attention by the operator.

Operation of the device and further objects and advantages thereof will become evident as the description proceeds and from an examination of the accompanying two pages of drawings.

BRIEF DESCRIPTION OF THE DRAWINGS

The drawings illustrate a preferred embodiment of the invention with similar numerals referring to similar parts throughout the several views wherein:

FIG. 2 represents a development of cam profiles controlling operation of the sequentially cam-operated switches of FIG. 1; and FIG. 3 is a chart showing the condition of various switches of FIG. 1 upon selection of individual cycles of operation and selected combinations thereof.

DESCRIPTION OF A PREFERRED EMBODIMENT

Figure 1:
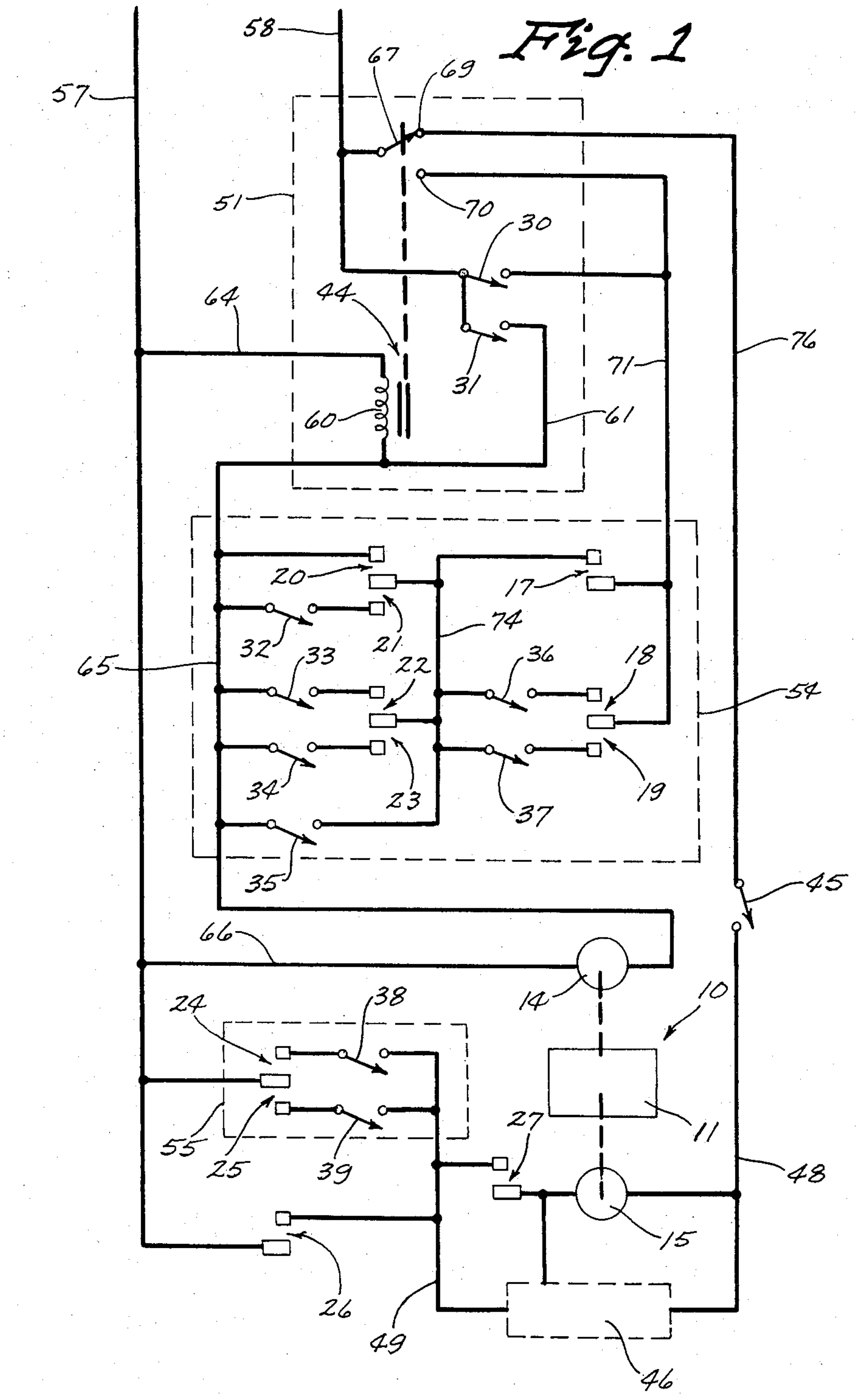
FIG. 1 is an electrical schematic circuit showing the control system of the instant invention.

Referring now to FIG. 1 in the drawings, there is shown an electrical schematic circuit including a number of diagrammatically illustrated components. This circuit may be used for controlling an electrically operated apparatus through a selectable preprogrammed series of sequential operations. In this embodiment the control circuit is shown as controlling the operation of an automatic clothes laundering device.

A plurality of individually selectable cycles of operation may be provided in a laundry apparatus by positioning a sequence control means to one of a plurality of predetermined start positions within the preprogrammed series of sequential operations. A selection system operable for achieving this desired positioning of the sequence control means is provided by the control system disclosed in the U.S. Pat. No. 3,011,079 issued to John C. Mellinger, entitled "Automatic Control Device," and assigned to the assignee of the instant invention. The control system disclosed therein is operable for positioning the sequence control means to a desired start position responsive to selection of a desired sequence of operations by the operator. More specifically, the sequence control means in U.S. Pat. No. 3,011,079 is advanced to the beginning of the specific selected cycle by rotating the cam stack at high speeds by a rapid advance mechanism under control of a circuit including switches operated by a preselection switch.

As compared to the selection of a single cycle of operations by the circuit of U.S. Pat. No. 3,011,079, the circuit of FIG. 1 is designed for initiating first and second cycles of operations. The selectable cycles may include a first or preliminary cycle, such as "Prewash" or "Soak" and a secondary cycle such as a regular wash cycle. To provide such a feature, the circuit must be operable for: (1) advancing to the beginning of the first or preliminary cycle independently of the order of selection of the first and second cycles; (2) operating through the first cycle; (3) advancing from the end of the first cycle to the beginning of the second cycle; (4) operating through the second cycle; and (5) turning off the apparatus at completion of the second cycle. All of these steps should occur without further attention of the operator after the initial selection of the desired first and second operations. Furthermore, the control system must also be operable for providing the desired operation if only one cycle is selected, be it either a preliminary or a secondary of cycle of operations.

The circuit of FIG. 1 includes a timer mechanism indicated generally by the numeral 10 and having a cam stack 11 driven selectively by a rapid advance motor 14 or a timing motor 15 for sequentially operating a plurality of pairs of contacts shown as cam-operated timer switches 17–27. The circuit further includes a plurality of switches comprising a preselection means and specifically including switches 30–39 operable between open and closed positions according to the chart of FIG. 2 under the control of manually actuatable push buttons, not shown but having indicia as listed under "cycles" and designated as "PreCycle," "Wash Cycle" or "Aux. Cycle" in FIG. 3. The circuit further includes a relay 44, a door switch 45, and other components and controls for a laundry device indicated schematically by the broken line box 46 connected across conductors 48 and 49 of the circuit.

The control system of FIG. 1 may also be considered from the viewpoint of function of the circuit. Thus considered, the circuit comprises sequence control means including previously cited timer mechanism 10 with cam-operated switches 17–27, rapid advance means 14 and timing advance means 15 for driving the cam stack 11. The sequence control means or timer mechanism 10 is operable through at least an arcuate portion of the cam stack 11 at a relatively slow speed for sequentially energizing and deenergizing component devices whereby a laundry machine is controlled through a programmed cycle of operations including washing, rinsing, and spin drying of the fabrics to be treated. Other arcuate portions of the rotatable cam stack 11 may provide alternate treatment cycles. The FIG. 1 circuit further comprises an energizing circuit 51 for initiating rapid advance of cam stack 11, a seeking circuit 54 for seeking the start point of the various selectable cycles of operation and initiating a timing advance of the cam stack 11, and a holding circuit 55 for providing initiation of a second selected cycle of operations upon completion of the first selected cycle of operations. As will be shown hereinafter, the initiating circuit 51, seeking circuit 54, and holding circuit 55 are conditioned by the operator's selection of desired cycles of operations.

The circuit of FIG. 1 may be supplied with conventional 115 volt 60 Hz. alternating current across power lines 57 and 58. The preselection switches 30–39 and timer switches 17–27 of FIG. 1 are in the open condition for pictorial convenience and for ease of explanation of circuit operation with the particular opening and closing of the switches being shown by FIGS. 2 and 3.

To describe the operation of the circuit, it is first assumed that the operator will select a single "Colored" cycle of operations, for example. It is further assumed that the machine is at the "Off" condition as at increment 60 of the cam chart in FIG. 2. From FIG. 3, it is determined that, when the "Colored" wash cycle is selected, switch 31 is momentarily closed, switches 32, 33, 36, 37, 38, and 39 are closed, and switches 30, 34 and 35 are open.

Upon selection of the cycle by depression of the "Colored" button by the operator, momentary switch 31 is closed and a circuit is completed to the coil 60 or relay 44 and to the rapid advance motor 14. The relay coil energizing circuit extends from line 58 through switch 31, a conductor 61, and through the relay coil 60 and a conductor 64 to line 57. Similarly, the rapid advance motor 14 is energized from line 58 through the momentarily closed switch 31, the conductor 61, and a further conductor 65 to one side of the rapid advance motor 14. The other side of the rapid advance motor 14 is connected to power line 57 through a conductor 66. Upon opening of the momentary switch 31, the energizing circuit to the relay coil 60 and rapid advance motor 14 is rerouted through the relay switch 67 operated from the first contact 69 to the second contact 70 and through conductor 71 and seeking circuit 54 as will be shown to include particular timer switches and preselection switches.

Turning briefly to FIG. 2, it is noted that one of the cam-operated switches 18 or 19, at least, is closed during the increments 1–35. Since switches 36 and 37, in series with switches 18 and 19, are closed with selection of a "Colored" cycle, a circuit will be completed from the conductor 71 to a second conductor 74 during the increments 1–35. It is further noted switch 20 is closed in the increments 1–35. Further consideration of FIG. 2 will show that in the 36th increment a circuit is still completed between conductors 71 and 74 through timer switch 19 and switch 37 but also will show that timer switches 20, 21, and 22 between conductors 74 and 65 are open. Thus the only path from the conductor 74 to the conductor 65 is through timer cam 23. In increment 36, however, switch 34 is open so that the energizing paths to the rapid advance motor 14 and relay coil 60 are broken and the sequence control cam stack 11 is positioned in the 36th increment for initiating operation of the apparatus through the selected cycle of operations.

In the 36th increment, the timer motor 15 will be energized by a circuit from line 58 and through relay switch 67 made to contact 69, conductor 76, closed door switch 45, and conductor 48 to one side of the timer motor 15. The other side is connected to line 57 through closed timer switch 27, switch 39 and timer switch 25. The cam stack 11 will thus be advanced into the 37th increment to begin the "Colored" cycle of operations. A circuit may also be completed to components such as a water valve which may be energized ancillary to the actual beginning of the washing cycle. Other control components, such as pressure switches or centrifugal switches may also become operative. The sequence control mechanism 10 will advance through increments 36–59 for the "Colored" cycle and then stop operation of the laundry apparatus in increment 60.

Assuming, instead, the selection of a "Prewash" cycle only, the rapid advance motor 14 will be energized in a manner similar to that previously described for the "Colored" cycle. responsive to the momentary closing of switch 30 as the operator depresses the button designated "Prewash," the relay coil 60 and rapid advance motor 14 will be energized through the seeking circuit 54. FIG. 2 indicates that the "Prewash" cycle begins at increment 30 and also indicates that, in the 29th increment, switches 17 and 18 are open. Switch 19 is closed but FIG. 3 shows that switch 37, in series with timer switch 19, is open so that upon reaching increment 29 the energizing circuit 54 will be broken and the rapid advance motor 14 deenergized for positioning the cam stack 11 to initiate the sequence of operations designated "Prewash." The timing motor 15 will be energized for advancing the cam stack 11 at a timing speed through increments 30–35 and upon reaching increment 36 the timing motor 15 will be deenergized for interrupting operation of the apparatus at an "Off" increment.

If, however, the operator desires both a preliminary and a secondary cycle of operations, such as "Prewash" and "White" washing cycles, the potential of the circuit is more fully utilized. Though the operator may press the "White" button first and then the "Prewash" button second, it is nevertheless desired that the "Prewash" cycle precede the "White" washing cycle, and thus the control system must properly position the timer cam stack 11 to the beginning of the preliminary or "Prewash" cycle.

Upon pressing of the "White" button first, the closing of momentary switch 31 will initiate energization of the relay coil 60 and the rapid advance motor 14 in a manner as previously described for the "Colored" selection. The cycle selection will establish circuitry to control advance of the cam stack 11 to the start of, or more precisely, the increment preceding the beginning of the "White" cycle, specifically increment 36. Subsequent operation of the "Prewash" button will, if the 36th increment has already been reached, reenergize the rapid advance motor 14 for readvancing the cam stack 11 to the increment 29 preceding the beginning of the "Prewash" cycle. If on the other hand, the "Prewash" button is pressed immediately after depression of the "White" button and before the rapid advance motor 14 drives the cam stack 11 beyond the 28th increment, the circuitry will be established to advance the cam stack 11 through the 36th increment and properly stop at the 29th increment as previously described. The "Prewash" cycle is thus initiated in the proper sequence prior to the "White" washing cycle.

If, however, the operator depresses the "Prewash" and "White" buttons in the order in which operation is desired, that is, "Prewash" first and "Wash" second, the advance system must insure that the cam stack 11 is properly positioned in increment 29 to initiate operation of the apparatus for the "Prewash" cycle prior to the "White" washing cycle. Upon operating the "Prewash" button, the relay coil 60 and rapid advance motor 14 will be energized upon closing of momentary switch 30 as previously described. Assuming the cam stack 11 was positioned at the "Off" increment 60, the cam stack 11 will be quickly rotated to the increment preceding the beginning of the "Prewash" cycle, namely, increment 29. If the selection of the "Wash" cycle is effected after the cam stack 11 is positioned at increment 29, the relay coil 60 and rapid advance motor 14 will be reenergized. It would then appear the cam stack 11 would be rotated from increment 29 to increment 36 to position the cam stack 11 at the beginning of the wash cycle which was last selected. The circuit of FIG. 1, however, provides means to prevent stopping of the cam stack 11 at increment 36 when the two cycles are selected in conjunction with each other. More specifically, the proper positioning of the cam stack 11 at the beginning of the first of two selected cycles is achieved through a bypass switch 35 operated to the closed position, per FIG. 3, upon selection of the two cycles. Switch 35 is in parallel with switches 32, 33, and 34 and thus overrides the start points established under control of switches 32, 33, and 34.

Thus with preselection switch 35 closed, the rapid advance motor 14 will be energized for advancement through increment 36 by a circuit which extends between conductor 71 through timer switch 17, conductor 74, and closed switch 35 to conductor 65, thus bypassing the open preselection switch 34 which would otherwise deenergize the rapid advance motor 14 for positioning the cam stack 11 at the beginning of the wash cycle. The cam stack 11 will then be rotated to increment 29 as previously described.

Thus, when two cycles of operation are selected such as "Prewash" and "White" wash cycles, the rapid advance motor 14 will be maintained energized to locate the cam stack 11 at the beginning of the preliminary cycle regardless of the order in which the two selected cycles are actually selected.

As previously indicated, the sequence control mechanism 10 will come under the control of the timing motor 15 in increment 29 and will advance the cam stack 11 through the normal sequence of operations comprising the "Prewash" cycle. Upon reaching the "Off" period in increment 36, at which point the timer mechanism 10 and apparatus would be deenergized if only the "Prewash" cycle had been selected, holding circuit means 55 advance the sequence control mechanism from the end of the "Prewash" cycle to the beginning of the "White" wash cycle and initiate operation of the apparatus at this position. The holding circuit 55 is shown by the broken line box in FIG. 1 and includes preselection switches 38 and 39 in series connection with timer switches 24 and 25, respectively. Referring to FIG. 3, it is noted that, when the two cycles "Prewash" and "White" wash are selected, switches 38 and 39 are closed. Similarly, it is noted in FIG. 2 that, at the "Off" increment 36 following the "Prewash" cycle, timer switch 25 is closed. Though timer switch 26 is open in the 36th increment, the closed switch 39 and timer switch 25 permit continued energization of the timer motor 15 during the increment 36 to advance the cam stack 11 through the "Off" increment. Advancement of the sequence control mechanism 10 to the 37th increment effectively initiates operation of the apparatus for the "White" wash cycle.

The circuit of FIG. 2 also includes an optional feature available to the operator through the provision of the pair of momentary switches 30 and 31 and through preprogramming of particular timer contact switches. The operator may, for example, desire to skip a portion of the wash cycle if a single regular wash cycle is selected. Assuming that the operator has selected a regular "White" washing cycle but desires to decrease the amount of washing time at the beginning of the cycle, the "White" button may be reactuated to close the momentary switch 31. As long as the button is depressed, the relay coil 60 and rapid advance motor 14 will be energized for rapidly moving the cam stack 11 through a portion of the washing operation. If the operator holds the button depressed for a period exceeding a predetermined period established by the cam switching, the sequence control mechanism 10 will continue advancing to the beginning of the selected cycle. This serves as a safeguard against inadvertently skipping an excessive portion of the cycle.

The instant invention may also be expanded to provide post cycles or auxiliary cycles following a regular washing sequence of operations to give the operator further flexibility.

The instant invention is thus capable of providing the operator with increased flexibility of selection and operation of a washing apparatus. The control sytem is operable, for example, to provide selection and control of one of a plurality of cycles; to provide selection of a pair of cycles sequentially operable without additional attention and independent of the order of selection; and to provide means for optionally eliminating an initial portion of a selected cycle.

In the drawings and specification, there is set forth a preferred embodiment of the invention and although specific terms are employed these are used in a generic and descriptive sense only and not for purposes of limitation. Changes in form and the proportion of parts as well as the substitution of equivalents are contemplated as circumstances may suggest or render expedient without departing from the spirit or scope of this invention as defined in the following claims.

I claim:

1. In an automatic control system for controlling an apparatus through a plurality of selectable cycles of operations, the combination comprising: sequence control means operable for programming said apparatus through said cycles of operations; drive means for advancing said sequence control means at at least one speed; preselection means for selecting first and second cycles of operations; control circuit means for initiating energization of said sequence control means at the beginning of said first cycle of operations independently of the order of selection of said first and second cycles of operations, said sequence control means being operable for deenergizing said apparatus and said drive means upon completion of each of said selected cycles of operations; and holding circuit means operable upon completion of said first cycle of operations for initiating said second cycle of operations.

2. In an automatic control system as defined in claim 1 wherein said control circuit means is associated with said preselection means and conditioned by said preselection means to control energization of said sequence control means.

3. In an automatic control system as defined in claim 1 wherein said holding circuit means is inoperable when a single cycle of operations is selected whereby said control circuit means initiates operation of said apparatus at the beginning of said single selected cycle of operations and said sequence control means deenergizes said apparatus and said drive means at the completion of said single selected cycle of operations.

4. In an automatic control system as defined in claim 1 wherein said drive means includes rapid advance means for advancing said sequence control means at a relatively fast speed and further includes timing means for advancing said sequence control means at a relatively slow timing speed and wherein said control circuit means is operable for energizing said rapid advance means for advancing said sequence control means to the beginning of said first cycle of operations and for energizing said timing means at the beginning of said first cycle of operations.

5. In an automatic control system as defined in claim 4 wherein said control circuit means includes first momentary switch means operable for initiating energization of said rapid advance means for advancing said sequence control means to the beginning of said first cycle of operations and wherein said control circuit means further includes selectively operable second momentary switch means for reenergizing said rapid advance means for optionally advancing said sequence control means through the initial portion of said first cycle of operations.

6. In an automatic control system for controlling an apparatus through a plurality of selectable cycles of operations, the combination comprising: sequence control means operable for programming said apparatus through timed sequential increments comprising said cycles of operations; drive means for advancing said sequence control means at at least one speed; preselection means for selecting first and second cycles of operations; control circuit means for initiating energization of said sequence control means at the beginning of said first cycle of operations independently of the order of selection of said first and second cycles of operations, said sequence control means being operable for deenergizing said apparatus and said drive means at predetermined increments upon completion of each of said selected cycles of operations; and holding circuit means operable upon completion of said first cycle of operations for advancing said sequence control means through the predetermined increment at the end of said first cycle of operations to initiate said second cycle of operations.

7. In an automatic control system as defined in claim 6 wherein said control circuit means and said holding circuit means include, respectively, first and second switch means actuated by said preselection means, said first switch means being operable for conditioning said control circuit means to effect initiation of said first cycle of operations, said second switch means being operable for energizing said drive means for advancing said sequence control means from the end of said first cycle of operations to the beginning of said second cycle of operations.

8. In an automatic control system as defined in claim 6 wherein said control circuit means includes first and second switch means operable at the beginning of said first and second cycles of operations respectively to effect energization of said apparatus and wherein said control circuit means further includes bypass switch means in circuit with said second switch means and operable when both of said first and second cycles of operations are selected to prevent initiation of said second cycle of operations and to effectively initiate said first cycle of operations.

9. In an automatic control system as defined in claim 8 wherein said first and second switch means are operable to an open condition at the beginning of said first and second cycles of operations respectively and wherein said bypass switch means is in parallel circuit with said second switch means and is operable to a closed position when both of said first and second cycles of operations are selected to maintain said drive means energized for advancing said sequence control means to the beginning of said first cycle of operations.

10. In an automatic control system for controlling an apparatus through a plurality of selectable cycles of operations, the combination comprising: sequence control means for programming said apparatus through said cycles of operations; timing means for advancing said sequence control means at a relatively slow timing speed; rapid advance means for advancing said sequence control means at a relatively high speed; preselection means for choosing a first and a second cycle of operations; initiating circuit means for initiating energization of said rapid advance means to advance said sequence control means; seeking circuit means for controlling continued energization of said rapid advance means and conditioned by said preselection means for deenergizing said rapid advance means and energizing said timing means at the beginning of said first cycle of operations independently of the order of selection of said first and second cycles of operations, said sequence control means being operable for deenergizing said apparatus and said timing means upon completion of each of said selected cycles of operations; and holding circuit means operable upon completion of said first cycle of operations for advancing said sequence control means to the beginning of said second selected cycle of operations and for initiating said second selected cycle of operations.

11. In an automatic control system as defined in claim 10 wherein said initiating circuit means includes a first momentary switch operable for initiating energization of said rapid advance means for advancing said sequence control means to the beginning of said first cycle of operations and further includes a second momentary switch operable for rapidly advancing said sequence control means through the initial portion of said first selected cycle of operations.

12. In an automatic control system as defined in claim 11 wherein said first and second momentary switches are associated with and responsive to operation of said preselection means for initiating energization of said rapid advance means.

13. In an automatic control system as defined in claim 10 wherein said initiating circuit means includes a momentary switch operable for initiating energization of said rapid advance means to advance said sequence control means and wherein said seeking circuit means includes first and second switch means operable at the beginning of said first and second cycles of operations, respectively, to effect deenergization of said rapid advance means and to effect energization of said apparatus and said timing means and wherein further said seeking circuit means further includes bypass switch means in circuit with said second switch means and operable when both of said first and second cycles of operations are selected to initiate said first cycle of operations sequentially prior to said second cycle of operations.

14. In an automatic control system for controlling an apparatus through a plurality of selectable cycles of operations, the combination comprising: sequence control means for programming said apparatus through said cycles of operations; timing means for advancing said sequence control means at a relatively slow timing speed; rapid advance means for advancing said sequence control means at a relatively high speed; preselection means for choosing a preliminary and a secondary cycle of operations; initiating circuit means for initiating energization of said rapid advance means to advance said sequence control means; seeking circuit means for controlling continued energization of said rapid advance means and conditioned by said preselection means for deenergizing said rapid advance means and energizing said timing means at the beginning of the preliminary cycle of operations independently of the order of selection of said preliminary and secondary cycles of operations, said sequence control means being operable for deenergizing said apparatus and said timing means at a predetermined increment upon completion of each of said selected cycles of operations; and holding circuit means operable upon completion of said preliminary cycle of operations for maintaining said timing means energized for advancing said sequence control means through the predetermined increment at the end of said preliminary cycle of operations to initiate said secondary cycle of operations.

15. In an automatic control system as defined in claim 14 wherein said seeking circuit means includes first and second switch means actuated by said preselection means and operable at the beginning of said preliminary and secondary cycle of operations respectively to effect deenergization of said rapid advance means and energization of said timing means and wherein said holding circuit means includes third switch means actuated by said preselection means, said first and second switch means being operable for conditioning said seeking circuit means to effect initiation of said preliminary cycle of operations, said third switch means being operable upon completion of said preliminary cycle of operations for energizing said timing means for advancing said sequence control means through said predetermined increment to the beginning of said secondary cycle of operations.

* * * * *